(12) United States Patent
Sims, III

(10) Patent No.: US 6,550,011 B1
(45) Date of Patent: Apr. 15, 2003

(54) MEDIA CONTENT PROTECTION UTILIZING PUBLIC KEY CRYPTOGRAPHY

(75) Inventor: J Robert Sims, III, Fort Collins, CO (US)

(73) Assignee: Hewlett Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/414,213

(22) Filed: Oct. 7, 1999

Related U.S. Application Data

(63) Continuation-in-part of application No. 09/129,370, filed on Aug. 5, 1998, now Pat. No. 6,438,235.

(51) Int. Cl.[7] .............................. H04L 12/22; H04L 4/30
(52) U.S. Cl. ..................... 713/193; 380/279; 365/52; 705/39; 705/54; 705/65
(58) Field of Search .................. 713/194; 380/279; 365/52; 705/39, 54, 65

(56) References Cited

U.S. PATENT DOCUMENTS

| | | | | |
|---|---|---|---|---|
| 4,811,288 A | * | 3/1989 | Kleijne et al. ................. | 365/52 |
| 5,590,197 A | * | 12/1996 | Chen et al. .................... | 705/65 |
| 5,629,980 A | * | 5/1997 | Stefik et al. ................... | 705/54 |
| 5,634,012 A | * | 5/1997 | Stefik et al. ................... | 705/39 |
| 5,715,403 A | * | 2/1998 | Stefik ........................... | 705/44 |
| 5,991,399 A | * | 11/1999 | Graunke et al. ............ | 380/279 |

\* cited by examiner

Primary Examiner—Gilberto Barron
Assistant Examiner—Paul E. Callahan

(57) ABSTRACT

A system and method for providing protection of content which may be transmitted over unsecure channels, including storage and transmission in bulk media, transmission over a network such as the Internet, transmission between components of an open system, and broadcast transmitted, to compliant storage devices and/or compliant use devices is disclosed. The technique for providing protection from unauthorized utilization of the content so stored is provided publicly in order to allow for those utilizing a conforming media device to master or generate content protected according to the present invention. According to a preferred embodiment, public key cryptography is utilized to identify compliant devices and to transmit cryptographic keys protecting content data. In the preferred embodiment content is protected using private key cryptography to optimize system performance.

32 Claims, 4 Drawing Sheets

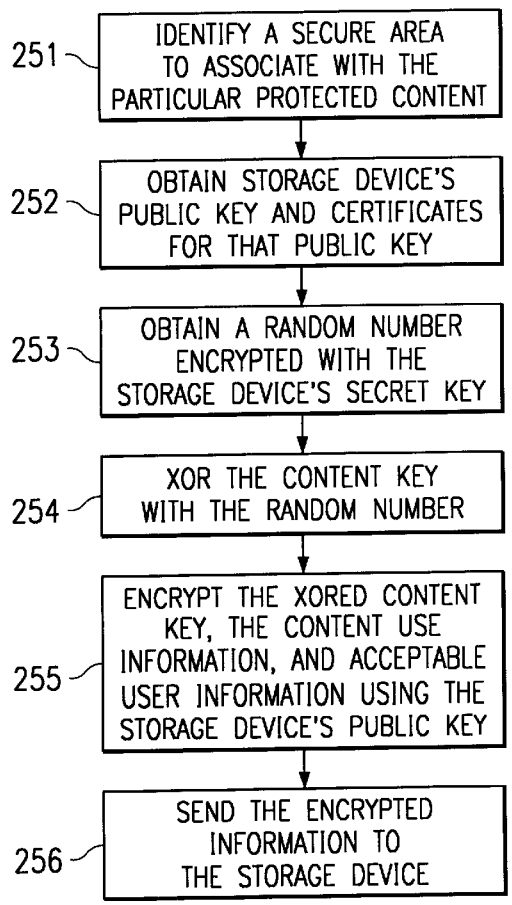
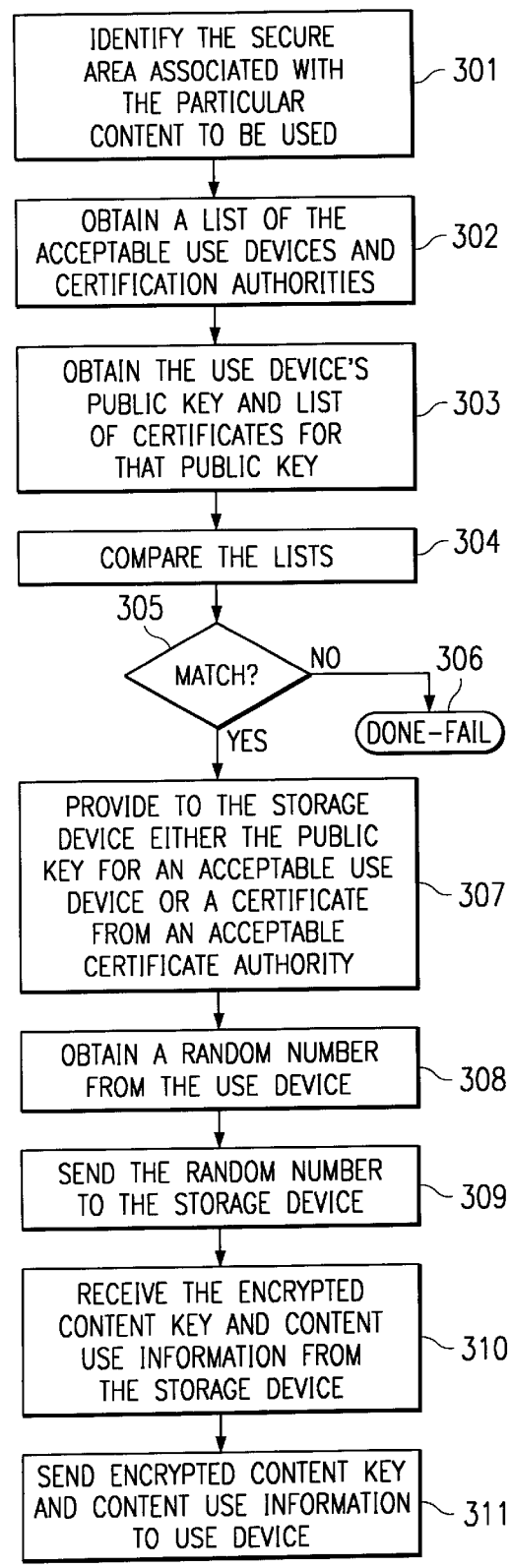

MEDIA CONTENT PROTECTION UTILIZING PUBLIC KEY CRYPTOGRAPHY

RELATED APPLICATIONS

The present application is a continuation-in-part application of co-pending commonly assigned, United States patent application Ser. No. 09/129,370, field Aug. 5, 1998 now U.S. Pat. No. 6,438,235, the disclosure of which is incorporated herein by reference.

TECHNICAL FIELD

The present invention relates to the protection, distribution, acquisition, and utilization of content, such as digital music content, and more particularly to systems and methods for providing distribution of such content over unsecure communication channels, including open systems such as the Internet, and establishing a robust set of rules for the authorized utilization of such content.

BACKGROUND

Currently there are various schemes in place for providing controlled or secure access to content such as may be recorded on bulk media and/or communicated from bulk media to user devices, such as user bulk media storage devices, content players, and the like. Specifically, computers and unprotected networks are currently used for distribution of copyrighted material, and such use is expected to grow rapidly in the future.

However, a computer is typically not a closed system, as it is generally composed of components, i.e., motherboard, video display adaptor, sound card, disk drive controller card, etcetera, made from many manufacturers. Accordingly, these components, as well as a network of the computers themselves, typically communicate, both internally and externally, over well documented interfaces. These interfaces include both hardware and software, e.g., application programing interface (API). Because there are many unprotected points in such systems, content that is to be protected is often encrypted.

Schemes have been developed, utilizing the above mentioned encryption, to protect content so that the owners of content can make content available to authorized users, while restricting unauthorized use, such as preventing the making of additional copies by an otherwise authorized user. However, these schemes often suffer disadvantages in requiring that the schemes themselves be kept secret in order to maintain security. Accordingly, the schemes may be implemented only by trusted parties in order to maintain the secret. Likewise, these schemes often rely on the total secrecy of cryptographic keys used by the scheme, as publication of such a key may result in loss of security for all or multiple parties using the scheme. Additionally, transfer schemes that are in place today suffer from problems with interception of the content, such as between components of a compliant system, in such a way as to allow its unrestricted or unauthorized use.

The relatively recent advent, and subsequent seemingly ubiquitous acceptance, of personal general purpose computers the Internet, and other wide spread data networks, and digital devices, such as portable digital media players, has spawned the proliferation of new scenarios for the distribution and utilization of digital content, such as music content. Accordingly, one area of particular concern with respect to controlling the transmission, reception, and/or use of content is the distribution of music content. However, it should be appreciated that other specific content infrastructures, such as those available for video content, suffer from all or some of the shortcomings described herein.

Most existing implementations existing today with respect to the distribution of music content are not very secure in that they can be intercepted at levels that are beyond the encryption. For example, most systems are currently based on proprietary protocols that are not necessarily very secure, i.e., they rely on the secrecy of the algorithm to be secure.

Other systems are susceptible to problems such as record and replay, where a conversation is watched and then later reproduced in order to counterfeit another authorization, such as to another machine not originally privy to the conversation. Such techniques are facilitated as the encrypted data in many of the present systems is sent in a single direction, i.e., little or no bilateral communication and no bilateral secure communication. Accordingly, a parasitic system may be deployed on a legitimate communication link to simply record what is being communicated between the systems communicating according to the particular security technique, i.e., record the conversation. For example, if it were desired to download music content to playback machine A and B, it is often possible to establish a legitimate dialogue between playback machine A and a service host system for receipt of a copy, via encrypted methods, of the music content which has been paid for. However, if a computer or other system is coupled to the link, it may record this conversation, although it does not understand the actual information being exchanged. Thereafter, this conversation may be replayed from the computer to playback device B to convince playback device B it has received an authorized copy of the music content.

Moreover, a significant portion of the software which handles the transfer or playback of such content is vulnerable to just snooping the data after a decryption step has been done on a host system. In this regard, one unauthorized access ("hacking") technique that is very common is to develop a piece of code that emulates, or otherwise pretends to be, a device used according to a legitimate use of the content, such as a sound card used in a playback of music content. However, rather than, or in addition to, performing the authorized function, such pieces of code may in fact syphon the data off into an unprotected file, or other destination, to allow its unrestricted subsequent access. These techniques take advantage of steps in which the content is not closely controlled.

These techniques have been accepted in the past, in spite of their inherent shortcomings, as the provision of content over unsecured communication links has been relatively insignificant as compared to more mainstream distribution, acquisition, and utilization methods. However, the online music industry has been growing to a point where controlling the unauthorized use of content is becoming a significant issue. Specifically, as the distribution of content through such means expands to include major studios, adoption of a secure protocol for the exchange and utilization of content has become more important.

The adoption of different security techniques is complicated by the fact that such content is often downloaded to or utilized by general purpose computers as described above. However, most of the components within such a computer are shared by a wide variety of applications, many of which require some level of protection for data. Implementing a separate protection scheme for different data types is an expensive proposition. Furthermore, requiring that individual general purpose devices, whether individually operable or operably with a general purpose computer, understand anything about the content it is holding is highly infeasible. Specifically, the processing power required to understand the content would be extremely expensive. Moreover, accurately understanding the content would be unreliable, as unrelated content may resemble protected information, particularly as the amount of content protected grows to include more and more works and/or types of content.

Schemes to block access to the main data of the information are highly impractical in a computer environment. Storage devices cannot typically identify what process is requesting information. For example, the current definition of the content scrambling scheme (CSS) for protecting DVD video requires that DVD-ROM drives disallow access to protected sectors until the DVD-ROM drive has verified that there is a compliant decoder in the system. However, once that identification has taken place, any process can read the protected data. This requirement has added expense and complexity to implementations for almost no extra protection.

In order for the exchange and utilization of music or other content to become as widely accepted as the media and distribution techniques it is replacing, the rules provided for its authorized transfer and use according to the security techniques should be robust. Specifically, it would be desirable to provide rules to allow for use of the content consistent with uses available from more conventional media. Moreover, it would be preferred to provide for use models not possible with more conventional media.

However, the present day security techniques, in addition to presenting the security shortcomings described above, generally have a very limited set of rules associated with the content. These rules are coupled with the data content in order to define what use of the content is authorized according to the particular scheme. For example, music content equivalent to an album may be distributed online, having rules associated therewith allowing the content to be played only. Such a rule is often referred to as "copy never." Alternatively, the music content may provide for copying from a computer system which initially downloaded the content to a portable playback device (PD). Such a rule is often referred to as "copy once." There is typically a state associated with the copy once rule when the copy has already been made which identifies a copy of an original what was authorized.

Accordingly, a need exists in the art for systems and methods adapted to allow for the distribution, acquisition, and/or utilization of content according to a variety of paradigms. Furthermore, a need exists in the art for distribution, acquisition, and utilization paradigms both that are consistent with the paradigms of more traditional media and that provide new scenarios, such as are particularly well suited to Internet communication and e-commerce.

Likewise, a need exists in the art for a more robust set of rules establishing authorized utilization of content. Moreover, as the user devices, such as content players, should understand and honor these rules, a need exists in the art for allowing new rules to be established, or existing rules to be altered, enhanced, etcetera. A need therefore exists in the art for user devices, and other equipment, to adapt to such new or altered rules in order to continue to properly control the content.

SUMMARY OF THE INVENTION

These and other objects, features and technical advantages are achieved by a system and method utilizing a technique, which itself is public, where only a subset of the individual cryptographic keys used thereby need remain private. Therefore, sensitive information, such as a cryptographic key associated with particular content (a content key), may be provided to such devices without substantial fear that such information will be publically disseminated.

Preferably, traditional well-understood encryption techniques, such as public key (asymmetric) and/or private key (symmetric) cryptography, are utilized according to the present invention as they have been well documented in the encryption community for a long period of time and have been proven to be very effective at providing security. Moreover, the infrastructure for employing such encryption techniques, such as the algorithms and components providing cryptographic operations, i.e., exponentiation and modulus operations, are commonly available and in many cases already deployed in systems.

In order to be available to all desiring the protection of such a system, the rules for generating keys suitable for use according to the present invention are preferably public. As the technique itself, as well as the rules for generating cryptographic keys to be utilized therewith, are public, the present invention allows for its use by all those so desiring. Moreover, as it is the cryptographic keys themselves, or portions thereof, which are maintained securely in order to provide security according to the present invention, rather than relying on the secrecy of the technique for their use, compromise of the secret information will result in only a content provider using that particular key having access to content compromised.

Operation of the preferred embodiment of the present invention is not to allow or disallow any particular transmission, but rather to obscure the content (information or data), using cryptographic methods, such that only a legitimate recipient can make use of that data, i.e., nobody but the content owner, or those authorized by him/her, is able to utilize protected media content. To this end, the present invention utilizes cryptographic algorithms well known in the art to provide cryptographic keys useful according to the present invention. However, the present invention provides unique systems and methods for managing and utilizing these cryptographic keys to thereby provide a cryptographic key management scheme, wherein the keys may be utilized for encryption or identification, which provides an end-to-end encryption technique for distribution of content.

Accordingly, for protected information, neither the data nor the secret keys are present in any unsecure communications channel in decrypted form according to the preferred embodiment of the present invention. In order to ensure no data or the associated cryptographic keys are presented in any unsecure communications channel in decrypted form, the preferred embodiment of the present invention utilizes compliant hardware and/or software at both ends of such a communication channel. Thus in operation according to this preferred embodiment, data is only decrypted by compliant or "legal" systems. Preferably, legal systems are defined by the author or owner of the content, or other entity affiliated with the content. Accordingly, systems that art not acceptable to this entity, for whatever reason, will not receive an appropriate cryptographic key, and thus cannot decrypt the information.

The most preferred embodiments of the present invention are implemented at least in part in hardware. Such implementations are preferred as software implementations are more subject to attacks likely to compromise the security. However, a preferred embodiment allows for the use of both hardware and software implementations of the present invention and provides for the selection of the particular implementations that are acceptable for use with any entity's content individually. For example, the author of the content may decide which receiving entities they trust to keep the integrity of their copyright. Accordingly, for content which is highly valuable, the author may decide that only hardware decoders, or decoders from a particular manufacturer or meeting particular standards, are to be allowed to decode the content.

In an embodiment of the present invention the individual devices, or a class or type of devices, trusted with the content are provided in a list or other database. Preferably, no unique host or device identifier is available or required according to the present invention. Therefore, changing of devices, such as for upgrade or due to failure, may be easily and seamlessly accommodated.

Preferably, each different device or each different implementation of the systems and methods of the present invention have a secret key/public key pair, such as may be generated and held secret by the manufacturer of that device. For example, a public/secret key pair is used where the secret key is known only by the manufacturer and provided only to particular ones of the manufacturer's devices. Therefore, each individual device, sets of associated devices, or manufacturers devices may utilize a different secret key known only to these devices. However, the corresponding public key is preferably widely published to content providers, certificate authorities, and/or the like. Accordingly, even where a particular device falsely identifies itself as a device of the above mentioned list, a content key can be encrypted using the public key of the legitimate device to prevent unauthorized utilization of the content.

In a preferred embodiment, a different content key would be associated with each work or collection of works. Accordingly, if a particular content key is compromised only the work or works associated therewith are compromised.

Digital signatures and/or certificates, such as may be provided by a certification authority or other trusted party, providing a level of confidence that a particular device is what it claims to be are preferably used according to the present invention. For example, all devices meeting a particular standard of operation, such as all hardware devices utilizing a particular encryption algorithm, may be provided a certificate by a trusted certification authority. This certificate may be the particular hardware device's public key, and possibly other information, encrypted using a particular secret key of the certification authority. The corresponding certification authority public key may be distributed to content providers with the understanding that it corresponds to certificates issued to devices meeting the aforementioned standard of operation. Thereafter, whenever a device presents its certificate, the content provider may be assured that when the certificate is decrypted using the certificate authority's public key, and a content key is encrypted with the resulting device public key, that only a device meeting the desired level of operational standards will be able to utilize the content.

According to the preferred embodiment of the present invention, root certification authorities are not required. Instead a variety of different certification authorities are encouraged to exist. In a most preferred embodiment, any entity that wishes to establish themselves as a certification authority is permitted to do so, with the only requirement for proper operation according to the present invention being that other entities participating in the content exchange and/or utilization recognize that this certification authority has certified a particular implementation meets a standard of operation. For example, certification authorities may be established for particular types of content, i.e., video, music, etcetera. Additionally or alternatively, various entities may establish themselves as those able to adequately test compliance of devices and, therefore, issue widely accepted certificates. Accordingly, any content provider etcetera that trusts a particular one of these entities may place their certificates on an acceptable list, or otherwise allow operation of devices certified by them.

Moreover, unlike prior art systems, where the scheme itself is secret, the preferred embodiment of the present invention allows the public at large to generate their own protected content without requiring license to the technology or requiring any secret information that they do not themselves generate. This is because the only secrets in the present technique are ones of the keys themselves and, in addition, allowing the rules for generating the keys to be public. Accordingly, any content provider may establish protected content and associated key sets usable according to the present invention.

Preferred embodiments of the present invention allow for the operation of compliant devices with content protected prior to the existence of particular ones of the compliant devices. For example, using the above preferred embodiment certificates, later developed playback devices may be provided with a certificate enabling their operation with content encrypted, and quite possibly distributed, before the systems and methods of the present invention could have known of these particular playback devices.

According to a preferred embodiment of the present invention, various encryption algorithms may be selected for particular works or types of content protected. Specifically, an encryption algorithm used to encrypt the data itself can be selected to provide a very high level of security or to be very fast and easy to implement depending on the type or value of data being encrypted. For example, content comprising audio only might utilize a less secure encryption algorithm in order to save gates in hardware implementations or to save time in software implementations for decryption, and thus facilitate its use on relatively inexpensive devices. With such content, these lower levels of security may be acceptable because it would likely cost more to crack the encryption algorithm than it would to simply rightfully purchase the content. However, where the value of the data being protected is high enough so that it is worth cracking the encryption algorithm if it were a weaker encryption algorithm, such if the content being exchanged were bank records, the preferred embodiment allows the use of a much stronger encryption algorithm. For example, content comprising new release movies or video, or other more valuable content, might utilize a more secure encryption algorithm in order to provide increased security, because of its relative infrequent playback access and/or the availability of relatively sophisticated devices playback devices.

Preferably, particular applications utilizing the systems and methods of the present invention implement a common set of encryption algorithms. According to a preferred embodiment, such applications as music content protection use a common set of encryption algorithms while other applications such as video content protection use a common set of encryption algorithms to thereby promote compatibility between devices adapted to utilize such types of content. For example, entities distributing music via the Internet standardize their protection of content according to the present invention to utilize a same symmetric encryption algorithm in order that each such music distributor can easily provide content that is operable on everyone's playback devices.

A robust set of rules establishing what may be done with the protected content, i.e, establishing authorized and/or unauthorized uses of the data, is preferably established according to the present invention. Accordingly, a robust set of distribution, acquisition, and/or use paradigms may be accommodated according to the present invention. For example, the rules of the preferred embodiment provide for the purchase of content, such as music, and its utilization, i.e., listening, online as it streams to the user's computer.

Additionally or alternatively, the rules may allow the user to only utilize the content that single time, or may provide for its recording for later playback once or a fixed number of plays, or even for a predetermined period of time. Another use or distribution model provided for according to a preferred embodiment of the present invention allows the distribution of a large piece of media, such as DVD, which includes many separate works, such as hundreds of individual songs or collections of songs. However, each, or ones, of these works are separately protected according to the present invention. Accordingly, a user may access a server and individually unlock or otherwise receive access to desired ones of the works. In this way the user is not required to purchase all the works, but only those in which he/she is interested. This model is advantageous because it saves download time as the bandwidth of many network connections are not yet high enough to speedily accommodate large transfers of data quickly.

The rules of the preferred embodiment provide not only for the actual utilization of the content, but also for content management. For example, rules are directed to the authorized copying of content, such as for backup purposes or for use on an alternative device. Such rules provide for serial copy management and, preferably, are adapted to restrict use of particular copies based upon particular copy management status.

Additionally, rules of a preferred embodiment of the present invention provide for broadcast models. For example, an encrypted stream of data may be broadcast such that anybody that chooses to receive it may do so. However, only those who have the appropriate content key provided by operation of the present invention may actually utilize the broadcast content.

According to a preferred embodiment of the present invention, the rules of the present invention are extensible. For example, associated with ones of the rules are flags which indicate a state of the rule and/or a particular extension to the rule.

Preferably, rules may be developed and added after a particular basic rule set has been established to provide additional functionality according to the present invention. As the preferred embodiment provided the rules with the associated content, and the compliant devices include processors capable of interpreting these rules, new or modified paradigms may be created to address current desires without altering any existing infrastructure of the present invention.

Accordingly, a technical advantage of the present invention is that unauthorized use of protected material is prevented. The content protectable according to the present invention includes audio information, video information, and computer information.

A further technical advantage is provided in that a robust set of use paradigms are supported, such as pay per view techniques, including authorization via phone or Internet, bulk media distribution, use restricted to a location, time, number of plays, and the like.

A still further technical advantage of the present invention is that utilization of protected content in both dedicated devices, such as portable players, and computers is provided for.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 2B illustrates a flow diagram of initial storage of a protected work in a compliant storage device;

FIG. 3 illustrates a flow diagram of the transfer of protected content using a general purpose computer system.

DETAILED DESCRIPTION

In understanding the concepts of the present invention it is helpful to refer to a specific embodiment wherein the present invention is utilized. However, it should be appreciated that the systems and methods of the present invention are not limited to the particular embodiments, whether it be the system components, the type of content, or the encryption algorithms, of the exemplary scenarios. Specifically, one of ordinary skill in the art should readily appreciate that the present invention is useful with any kind of content that can be represented digitally. Accordingly, it is envisioned that the systems and methods of the present invention may be utilized to protect various forms of content including video (whether video image alone or in combination with audio and/or other information), audio (whether music or any other audio information), software programs, still images, compiled information (including databases, original works, historical data, graphical data, and/or the like).

Figure 1:
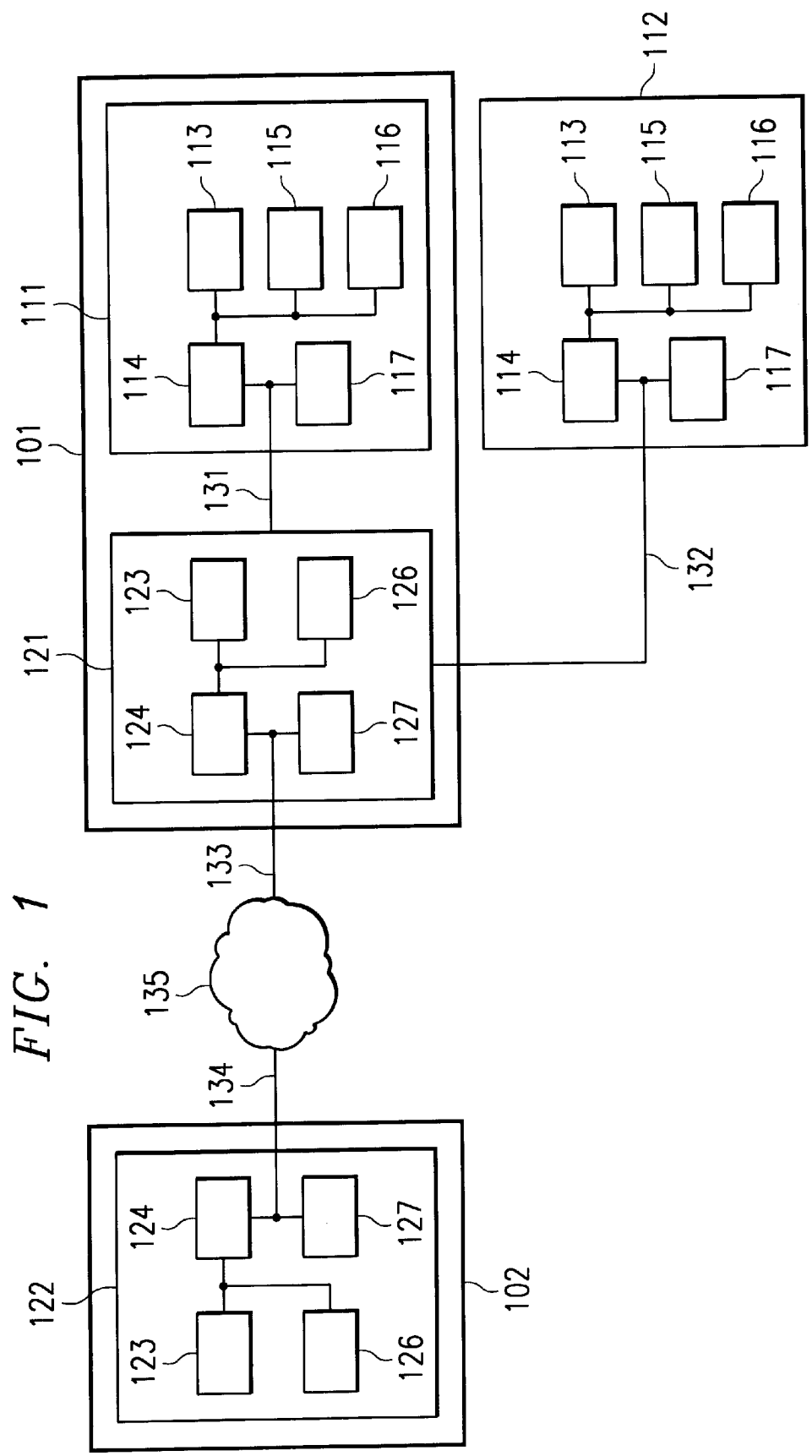
FIG. 1 illustrates media systems adapted according to a preferred embodiment of the present invention.

The protection of content according to the present invention is preferably implemented so as to protect the unauthorized utilization of content. Distribution, acquisition, and utilization of such content are all preferably controlled according to the present invention. Accordingly, there are essentially three components, such as illustrated in FIG. 1, wherein systems and methods of the present invention are implemented, those being information use (playback) components or devices (use devices 111 and 112), information storage (whether embedded or removable media) components or devices (storage devices 121 and 122), and communication channels (links 131–135).

Operation of the preferred embodiment of the present invention is not to allow or disallow any particular transmission, but rather to obscure the content (information or data), using cryptographic methods, such that only a legitimate recipient can make use of that data. According to the preferred embodiment of the present invention there is no requirement that any communication channel be secure, whether internal to a system such as link 131 internal to computer 101, external to systems such as links 132, 133 and 134, or links implemented through systems such as network 135. For information protected by operation of the present invention, neither the data nor the secret keys are present in any unsecure communications channel in decrypted form. In order to ensure no data or the associated secret cryptographic keys are presented in any unsecure communications channel in decrypted form, the preferred embodiment of the present invention utilizes compliant hardware and/or software, such as may be embodied in the above mentioned information use devices and information storage devices, at both ends of such a communication channel.

It should be appreciated that protection of content according to the present invention allows for the distribution of protected content at any time and in any manner deemed advantageous. For example, according to one distribution model accommodated by the present invention, protected content, and possibly associated content use information, may be recorded on bulk media, such as DVD-ROM and distributed in mass to any and all potential purchasers of the content. Thereafter, a content cryptographic key, and possibly associated content use information, may be transmitted to individual users upon payment for the content, to thereby facilitate their authorized use of the content. Additionally, according to another distribution model accommodated by the present invention, a content cryptographic key, and possibly associated content use information, may be transmitted to individual users upon payment for broadcast content. Thereafter, these users may use the content cryptographic key in authorized utilization of streaming protected content.

According to a preferred embodiment of the present invention all content of the same type is encrypted the same way. This is preferred to reduce the number of different implementations necessary to realize security according to the present invention as well as to enhance compatibility. For example, if music is produced to be protected according to the present invention, it would preferably be encrypted with the music encryption algorithm, i.e., whatever algorithm is actually chosen as the correct balance between security and implementation costs.

According to a volume or super distribution model, where large quantities of content are distributed such as by mass disk stampings or provided on a very busy server on the Internet, content would preferably be encrypted once and everybody utilizing the same content would require the same content key in order to decrypt that content.

Additionally or alternatively, it is also possible to uniquely encrypt the content per user so that if unauthorized copies are made available or a secret key is published the source might be identified. However, use of multiple content keys for a single protected work increases costs in that multiple keys must be generated and maintained as well as multiple precessing of the content to encrypt it must be accomplished.

Content keys according to a preferred embodiment of the present invention are generated by content owners, the authors, or some other entity affiliated with the content (content providers). Therefore, no content key need be shared among various participating entities such as the manufacturers or distributors, thus providing confidence that a particular content provider's content key is only going to be utilized according to the present invention. To further add to the confidence that a mishandled content key will compromise the security of a smallest amount of protected content as possible, it is envisioned that a distinct content key will be generated for each protected work. Of course, where breaches in content key security are not a substantial concern, a single key may be generated for multiple works, such as a single content key for all works of a collection or a single content key for all of a particular author's works.

The present invention preferably uses public key (asymmetric) and/or private (symmetric) key cryptography for the encryption of protected information to thereby render the information indecipherable or otherwise unusable to all but authorized users. As is well known in the art, public key cryptography provides a convenient means by which cryptographic keys may be exchanged without compromising the security of the data encrypted for use by a particular user. Specifically, as data encrypted with a public key can only be decrypted with a corresponding secret key, publication of the public key, even to untrusted entities, does not compromise the security. However, such asymmetric key cryptography typically requires more complicated encryption and/or decryption algorithms than symmetric key cryptographic techniques. Accordingly, the use of asymmetric cryptographic techniques can require more processing power to implement and may require longer times to actually accomplish the encryption and/or decryption.

Private key cryptography generally provides for simplified implementation, i.e., less resources for processing and less time to actually accomplish the encryption and/or decryption. However, due to the symmetric nature of the keys, distributing a key introduces the risk that a recipient may utilize the key with data or transactions other than that intended, as the key does not require a corresponding secret key to be useful.

The preferred embodiment of the present invention utilizes both public and private key cryptography. For example, public key cryptography is utilized to distribute keys allowing for subsequent encrypted communications, such as the transfer of an encrypted content key through an unsecure communication channel. Accordingly, a public key may be provided from one compliant device, such as a playback device, to another compliant device, such as a storage device, through an unsecure communication channel to enable the other compliant device to encrypt a secret content key, and possibly other data associated with the particular content, and transfer this encrypted key back through the channel to the other device. Thereafter, content protected, and presumably also communicated between the devices through the unsecure communication channel, using encryption with this secret key may be decrypted for use by the receiving device. As it is presumed that the content, such as a musical work or a video production, will include substantially more data than ancillary communications, such as the content key, the utilization of both public and private key cryptography is preferred to provide a desired level of security and to optimize the utilization of resources.

In a most preferred embodiment, public keys are distributed utilizing a certificate authority, i.e., a third party to the transaction which certifies the authenticity of the public key being associated with a compliant device. Such certificates are preferably a public key cryptography technique utilizing the certificate authority's public keys, as is well known in the art.

An information use device, such as use devices 111 and 112, preferably a standalone secure unit, such as a secure component of a computer system (e.g. computer 101) or a "tamper resistant" software component of a computer system (either of which may be represented by user device 111) or an independently operable device such as a portable player (which may be represented by user device 112). Accordingly, the preferred embodiment user device includes a processor (processor 114) and associated instruction set to control operation of the use device and its components according to the present invention.

According to a preferred embodiment, a compliant information use device will include a secure storage area or areas for storage of protected content and associated information, such as cryptographic keys utilized according to the present invention. Such storage areas are shown as secure storage areas 113 in user devices 111 and 112. The secure storage area is preferably not readable or directly writeable by any element external to the information use device.

For example, a most preferred embodiment compliant information use device includes a secure area for storing a content decryption key. Moreover, if the information use device is adapted to store or otherwise operate with more than one protected work, the information use device is preferably adapted to store more than one content decryption key in a secure storage area or areas. In such cases, the information use device is preferably adapted to associate each content key with its corresponding content.

A preferred embodiment compliant information use device also includes secure areas, such as a portion of storage area 113, for storing content use information. Such information may include a generation counter, generation limit, copyright status indication, expiration information, watermark verification data, region coding, byte count limits, time limits, expiration based on the end of the content, and the like. Moreover, if the information use device is adapted to store or otherwise operate with more than one protected work, the information use device is preferably adapted to store more than one set of content use information. In such cases, the information use device is preferably adapted to associate each set of content use information with its corresponding content.

An information use device according to the preferred embodiment of the present invention additionally includes a decryption engine (encryption/decryption engine 116), such as may be embodied in hardware, software, or a combination of both, that can use a content key, such as that described above stored in the secure storage area, to decrypt encoded data into a usable form. In the most preferred embodiment, decrypted data will not be made available to any but legitimate channels, such as use component 115 which, for example, may be an audio decoder to only analog outputs included in the compliant information use device.

In a preferred embodiment of the present invention, an encryption engine providing encryption functions inverse to those of the above described decryption engine is also provided in the information use device. For example, the preferred embodiment of FIG. 1 includes encryption functionality in encryption/decryption engine 116.

In order to accommodate secure exchanges through unsecure communication channels as described above, the preferred embodiment compliant information use device includes a preselected device secret key. This key is preferably not readable by any element external to the information use device and, therefore, is preferably stored in the above described secure area. Also to accommodate secure exchanges through unsecure communication channels, the preferred embodiment compliant information use device includes a device public key corresponding to the device secret key. However, as this key is a public key, it is preferably directly readable or other wise available to elements external to the information use device and, therefore, is stored outside the above described secure area, such as within storage area 117.

A decryption engine, similar to or a part of the decryption engine described above (encryption/decryption engine 116), is also preferably included in the information use device to enable decryption of data encrypted using the device public key. For example, the device public key may be utilized to encrypt a content key and transmit that encrypted content key to the information use device. Thereafter, the decryption engine, utilizing the device secret key, decrypts the content key for use with the associated encrypted content.

In a preferred embodiment, where digital signatures or certificates are utilized to ensure that particular public keys are associated with compliant devices acceptable to content providers, authors, etcetera, the information use device also stores certificates from certification authorities. These certificates are preferably directly readable, such as by storage in storage area 117, and include identification of compliant devices meeting particular standard of operation. Certificates associated with or identifying the information use device may be stored with the other above mentioned certificates and/or may be available elsewhere.

The use device may also include components in addition to those described above, for example, components useful in the distribution acquisition, and/or use of protected information, such as random number generators, may also be included in the use device. Additionally, or alternatively, components, such as additional use components for providing different modes or personalities of use, may be included in the use device.

It should be appreciated that the components, or portions thereof, of the above described preferred embodiment use device may be embodied in a very large scale integration device or other small component. For example, a preferred embodiment of the present invention utilizes a touch memory utility button, available from Dallas Semiconductor as an IBUTTON, including a processor, cryptographic functionality, and memory. This device may be easily coupled to various components, such as portable devices, computer sound boards, DVD players, or even computers themselves, such as through a dongle coupled to a serial or parallel interface port, in order to provide control of such devices according to the present invention. Moreover, such small devices may be easily made portable, so as to allow their coupling and, therefore transfer of authorized use of content there between.

An information storage device, such as storage devices 121 and 122, is preferably a standalone secure unit, such as a secure component of a computer system (e.g. computer 102) or a "tamper resistant" software component operable with storage media (either of which may be represented by storage devices 121 and 122). Accordingly, the preferred embodiment storage device includes a processor (processor 124) and associated instruction set to control operation of the storage device and its components according to the present invention.

According to a preferred embodiment, a compliant information storage device will include a secure area or areas for storing information according to the present invention. Such storage areas are shown as secure storage areas 123. The secure area is preferably not readable or directly writeable by any elements external to the information storage device.

For example, a preferred embodiment information storage device includes a storage area for storing a preselected device secret key. Preferably, this secret key is not directly readable by any element external to the information storage device. Also to accommodate secure exchanges through unsecure communication channels and/or storage of data on unsecure media, the preferred embodiment compliant information storage device includes a device public key corresponding to the device secret key. However, as this key is a public key, it is preferably directly readable or otherwise available to elements external to the information use device and, therefore, is stored outside the above described secure area, such as within storage area 127.

The most preferred embodiment compliant information storage device also includes secure areas for storing one or more secure data sets. Such data sets may include an identification of the data set, such as a simple enumeration, content decryption keys, content use information, and public keys and their corresponding signatures. These data sets are preferably associated with particular protected works, providing association to the content of content keys and information regarding any restrictions on use of the content (content use information).

An information storage device according to the preferred embodiment of the present invention additionally includes a decryption engine (encryption/decryption engine 126), such as may be embodied in hardware, software, or a combination of both, that can decrypt a content key encrypted with the device's public key. An encryption engine (encryption/decryption engine 126), such as may be embodied in hardware, software, or a combination of both and as may be a part of the decryption engine described above, is also preferably included in the information storage device to enable encryption of a content key encrypted with the devices' public key. Accordingly, content keys may be encrypted using the above mentioned device secret key, such as for transmission to compliant devices or for storage on unsecure media, and may be decrypted for use by the storage device (whether to decrypt the corresponding content, to re-encrypt using a compliant device's public key for transmission through unsecure channels, or the like).

In a preferred embodiment, where digital signatures or certificates are utilized to ensure that particular public keys are associated with compliant devices acceptable to content providers, the information storage device also stores certificates from certification authorities. These certificates are preferably directly readable, such as by storage in storage area 127, and provide identification of compliant devices meeting particular standard of operation. Certificates associated with or identifying the information use device may be stored with the other above mentioned certificates and/or may be available elsewhere.

The preferred embodiment compliant information storage device is adapted to verify certificates, such as those provided by a certification authority described above. For example, the information storage device may have stored therein, such as in the secure area, a known accurate copy of the certificate authority's public key (or multiple ones of the public keys, such as may be associated with certificates of devices, types of devices, or groups of devices, meeting particular standards of operation). This key may be utilized with the above described decryption engine, or one similar thereto, to decrypt a certificate provided as authentication/identification of another device. Decryption of the certificate to provide a usable device public key may be relied upon to provide confidence that the otherwise unknown device is a compliant device (at least to the level indicated by the certificate/certificate authority).

As with the preferred embodiment use device, it should be appreciated that the components, or portions thereof, of the above described preferred embodiment storage device may be embodied in a very large scale integration device or other small component. For example, a preferred embodiment of the present invention utilizes a touch memory utility button, such as the aforementioned IBUTTON. Such a device may be easily coupled to various components, such as disk drives, DVD-ROM drives, or even computers, in order to provide control of such devices according to the present invention. Moreover, such small devices may be easily made portable, so as to allow their coupling to different ones of such devices and, therefore, transfer of authorized control of such content there between.

Figure 2A:
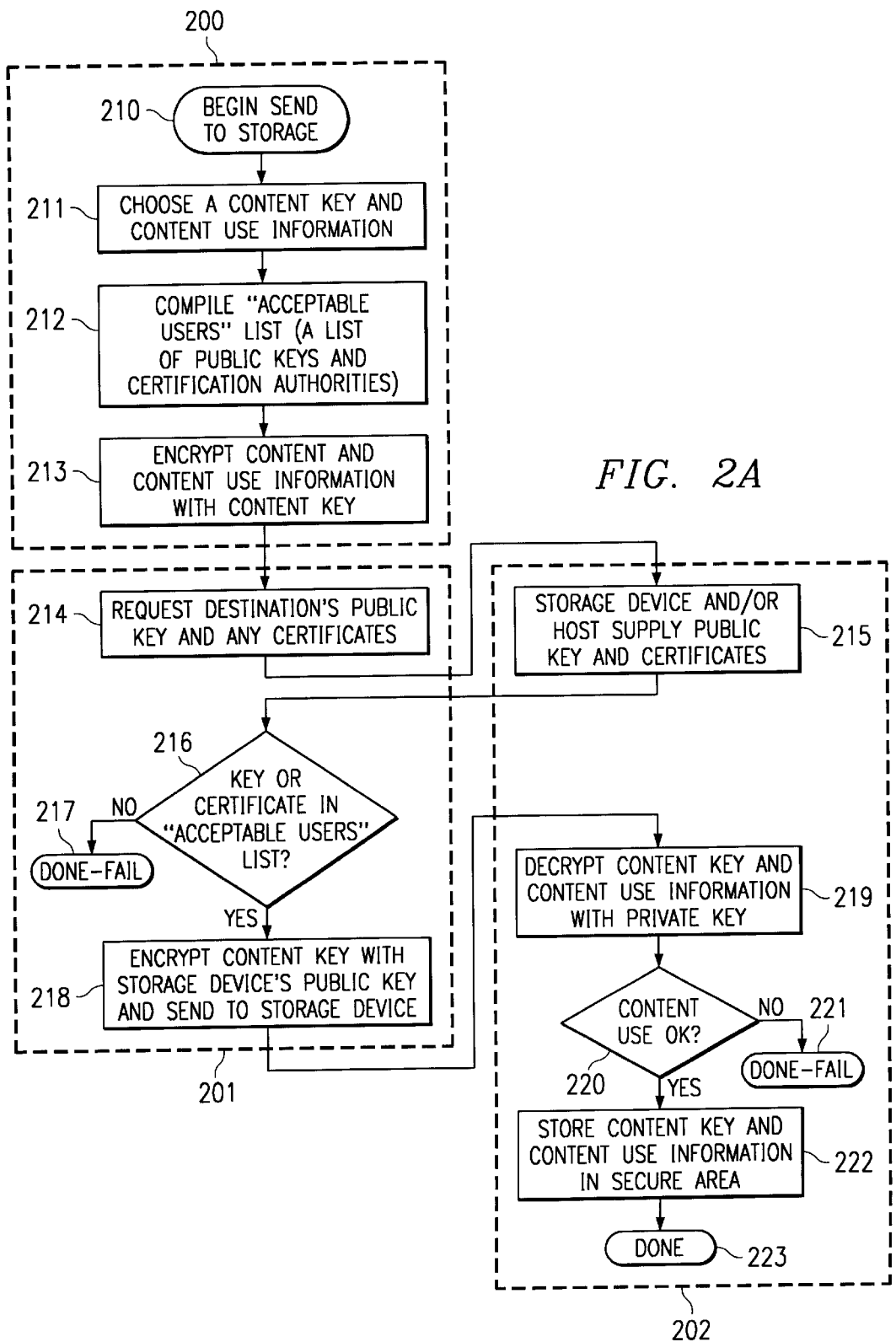
FIG. 2A illustrates a high level flow diagram of operation of the present invention to provide protected content to a compliant device.

A preferred embodiment of the steps performed in protecting content according to the present invention is shown in the flow chart of FIG. 2A. The preferred embodiment steps shown in FIG. 2A are illustrated divided into three groups indicated by boxes 200, 201, and 202. These boxes delineate the steps performed by various system components according to the preferred embodiment. Specifically, box 200 delineates the steps performed by a content provider in initially protecting a work, such as upon a host distribution computer as may be represented by computer 102 of FIG. 1. Box 201 delineates the steps performed by the content provider in storing the protected work for utilization according to the present invention. It should be appreciated that the steps of box 201 are also the steps a compliant information storage device, such as storage device 121 or 122 of FIG. 1, perform in providing information, such as the content key and/or content use information, to another compliant device, such as storage device 121 or 122 or use device 111 or 112 of FIG. 1, as the use rules of the present invention permit. Box 202 delineates the steps performed by a compliant information storage device, such as storage device 121 or 122 of FIG. 1, perform when provided information by the content provider. It should be appreciated that the steps of box 202 are also the steps a compliant device, such as storage device 121 or 122 or use device 111 or 112 of FIG. 1, perform in receiving information from another compliant device according to the present invention.

As described above, the steps of box 200 are preferably performed by content provider or other owner or controller of the content to initially protect the content and to establish the proper restrictions upon its use. Accordingly, in a distribution model, these steps are preferably performed once per work. However, in alternative embodiments these steps may be performed as often as desired, such as each time a particular work is distributed.

Initial protection of the content according to the preferred embodiment of FIG. 2A begins at step 210 wherein the content data is provided to a system operable according to the present invention, such as upon a bulk storage device of computer 102. At step 211, a content key and content use information is selected for use with this particular content. Selection of a content key may involve selecting a particular key from a group of keys unique to the content provider. This may be a key selected for use only with the particular work or which has been associated with a type or group of works. Of course, the content key may be generated rather than selected, such as where no preestablished cryptographic keys are available to the host system.

The content use information preferably include rules establishing authorized uses of the content. Rules contained in the content use information may preferably include serial copy management rules (i.e., "allow playback XXX times;" "allow playback until XXX date;" "only allow playback in region XXX;" "delete content after playback;" "delete content after XXX playbacks;" "delete content after XXX date;" and the like), and serial copy tracking (i.e., "the generation count shall be increased by one each time the content key is moved;" "the generation count limit is 2;" "after transferring the content key, delete the key;" "the content should have a watermark with ID XXX;" "analog output copy protection XXX should be turned on;" and the like). The rules may additionally or alternatively include rules setting forth particular modes of compliant device operation acceptable for use with the content, particular compliant devices the content may be used with, particular configurations of compliant devices the content may be used with, and the like.

At step 212 a list of acceptable users is compiled. This list includes devices the content provider trusts to maintain the integrity of its content key and, therefore, the associated content. This list may be as to particular individual devices, particular types or groups of devices (i.e., all compliant hardware devices or all compliant software devices employing component XXX, or even devices or groupings of devices certified by a particular trusted certification authority (i.e., all manufacturer XXX's certified by certification authority YYY).

The list of step 212 may not specifically identify devices, groups of devices, manufacturers, or certification authorities. For example, the list may simply include a list of certificate authority public keys associated with the certificates of authorized devices. According to a preferred embodiment of the present invention certification authorities will provide different certificates for different types of devices, such as embedded storage, removable storage, streaming playback devices (no storage), and write-only storage/playback devices, to facilitate selection of devices authorized to use particular protected works. Additionally or alternatively the list may include a list of device public keys associated with the devices or groups of devices.

At step 213 the content is encrypted using the content key selected at step 211. Also according to the preferred embodiment the content use information is encrypted in order to protect it from unauthorized alterations, such as changing any of the limitations of the above described rules. Additionally or alternatively, content use information may be provided in clear text so as to apprize all who are interested of the allowed use of the content. However, in order to prevent the unauthorized alteration of this use information, a technique is utilized to determine or prevent its unauthorized alteration. For example, the clear text information may also be provided in encrypted form. Additionally or alternatively, in a preferred embodiment a secure hash of the use information may be provided, such as by encrypting a hash of the content use information using the content key.

It should be appreciated that the encrypted content, encrypted content use information, and content key are each associated with one another to facilitate their use together according to the present invention. Accordingly they may be stored together or otherwise commonly indexed. It should be appreciated that, as the content and the content use information are encrypted using the content key, they may be stored in an unsecured area, such as storage area 127 of storage device 122. Accordingly, inexpensive bulk media provided in a common freely accessible portion of the system may be used to store large quantities of content and associated information. It should also be appreciated that transfers of protected content to non-compliant devices will work, but movement of keys, or at least useful keys, to non-compliant devices will fail.

However, as the content key provides access to protected content, it is preferably stored in a secure area, such as secure area 126 of storage device 122. Of course, the content key may be encrypted, or otherwise rendered unusable, such as by encrypting it with the public key of the storage device, or preferably a hidden key unique to that device so that other devices sharing a same public/secret key set are not enabled to utilize the content key, in order to allow its storage in an unprotected media, if desired.

A preferred embodiment of the steps utilized for storage of the content key within the secure area of a compliant storage device as provided by another compliant device (originator device) are shown in FIG. 2B. At step 251, a secure area within the storage device to associate with the particular protected content is identified. At step 252 the storage device's public key and certificates for that public key are obtained and sent to the originator device. At step 253 a random number encrypted with the storage device's secret key is obtained also by the originator device.

At step 254 the content key is exclusive ORed (XORed) with the random number at the originator device. It should be appreciated that the use of a random number or other unique information in this way will prevent a replay of the conversation to another compliant device sharing the same public secret key set from establishing a useful copy of the content therein. Moreover, the use of the random number from the storage device may be relied upon to add an extra layer of security to the transfer of the content key, even for a non-compliant device having access to the same public/secret key set. For example, the random number may be encrypted by the storage device, such as by using a public key of the authoring device, thus preventing even a similar storage device with access to a secret key corresponding to the same public key used in encrypting the content key from usefully decrypting the content key.

At step 255 the XORed content key, the content use information, and acceptable user information are encrypted with the storage device's public key by the originator device. Thereafter, at step 256, the encrypted information is transmitted from the originator device to the storage device. Preferably, the storage device uses its secret key to decrypt the information, XOR the content key with the random number, and store the appropriate decrypted information in the secure area.

As described above, the protected content is preferably stored on a compliant information storage device, such as storage device 122, such as may be utilized for distribution, i.e., a download server. The remainder of the steps of FIG. 2A will be described with reference to another compliant device (destination device) obtaining the content, content use information, and content key for actual use of the content.

After the content has been protected according to the present invention it may be provided to various compliant devices, such as the aforementioned storage devices and/or use devices. However, as only the compliant devices authorized by the content provider etcetera are to receive the content key, the present invention operates to identify the device to which the content is to be provided.

Accordingly, at step 214 the host device (whether a server, storage, or use device) requests the destination (whether storage or use) device's public key and/or any certificates, in order to confirm the identity of the device as a compliant device authorized by the content provider. Thereafter, at step 215 the destination device, and possibly a host associated with the destination device, supplies the public key and certificates.

Transmission of the certificates is particularly useful in situations where the destination device is a less known device, such as provided by a relatively small company or is a relatively new device, and does not appear on the source device's list of acceptable devices. If the certificate is provided by a certificate authority that the content provider trusts, the certificate should be acceptable proof of the device's compliance.

In a preferred embodiment, the certificate is decrypted by the public key of the certification authority available to the storage device and the result is compared to the public key provided by the destination device. If there is a match, it can be confidently assumed that the destination device is what it purports to be.

At step 216, the public key and/or the certificate may be compared to the content use information, such as may be decrypted using the content key available to the storage device, to determine if the device is authorized to receive/utilize the content. If neither of the key and/or certificate appear in the acceptable device list of the content use information, then processing proceeds to step 217 wherein a failure condition halts transfer of protected information, such as the content key. It should be appreciated that until this point in the processing, no secret information has been exchanged and, thus, until the destination device is properly identified no secret information will be exchanged.

If either or both the key and certificate appear in the acceptable device list of the content use information, then processing continues to step 218. At step 218, the host device (whether a server, storage, or use device) encrypts the content key with the destination device's public key. Accordingly, the content key is rendered useless to all except the holder of a secret key corresponding to the destination device's public key. This secure version of the content key is provided to the destination device. Additionally, the content key may be further protected, if desired. For example, information unique to the destination device, such as a random number generated by the destination device, any be compounded with the content key, such as by as a mathematical operation, e.g. exclusive OR (XOR) function. Accordingly, even where multiple destination devices share the same public/secret key set, recording of the conversation will not result in the useful download of the content to a second device.

At step 219, the destination device receives the encrypted content key. The content and/or the content use information may be transmitted with the content key from the host device, such as through the same links used for communication of the content key. Alternatively, the content and/or content use information may be provided to the destination through other means, such as being provided on a separate piece of bulk media, i.e., a DVD-ROM.

As the content key is encrypted using the destination device's public key, the destination device is able to decrypt the content key using its secret key. As the destination device is compliant with operation according to the present invention, the content provider can be confident that the decrypted, and therefore useful, content key will be protected according to his desires, such as may be indicated in the content use information.

Once the content key has been decrypted, it is now possible for the destination device to make use of the content. However, use of the content is preferably proscribed by rules established by the content provider, such as is preferably indicated in the content use information. Accordingly, at step 220 a determination is made as to whether a particular use of the content is authorized. This determination may be made by using the content key to decrypt the content use information and compare the uses proscribed therein with the proposed use of the content. If the use of the content is not authorized, processing proceeds to step 221 wherein a failure condition halts transfer of protected information, such as the content key. However, if the use of the content is authorized, processing proceeds to step 222.

At step 222 the decrypted content key is stored in a secure area of the destination device. Likewise, the decrypted content use information is also preferably stored in a secure area of the destination device. Additionally or alternatively, the encrypted content key and/or encrypted content use information may be stored in an unprotected storage area in or coupled to the destination device, if desired.

For example, where the secure area of the destination device is limited, such as the small amount of storage space provided in the secure confines of a touch memory utility button such as the aforementioned IBUTTON, a limited number of content keys may be accommodated. However, this secure device can be programmed to include its own cryptographic key or key set, for which even the owner of the device cannot gain access to. Accordingly, the secure device may be instructed to hold the content key in decrypted form when it is needed for use of the content, but to encrypt the content key with the secure device's cryptographic key when not presently needed. Accordingly, the content key may be stored on any media accessible to the secure device, thus making available some of the limited storage space therein for another content key, such as may be needed for a current use of content. Such an embodiment provides for virtually limitless storage of secure information, as unsecure storage media may be used.

Preferably, the content key as encrypted by the secure device is unique to that particular device, such as by using the above described random number, in order to prevent its being introduced to an identical brand device and thus enabling a second device to utilize the protected work. Accordingly, only one secure device may utilize the content key as encrypted, although it can be copied in encrypted form for backup purposes, etcetera.

Having determined that the use of the content is authorized and having received a content key which is or may be rendered useful, such as by decryption, use may be made of the content according to the rules established by the content provider (step 222), as discussed in more detail below. For example, a dedicated player device can simply read the content decryption key and the content use information to play the data. However, use on other devices, such as a general purpose computer may utilize additional steps. Thereafter, processing concludes at step 223.

A preferred embodiment of the steps performed in playback of content on a general purpose computer are shown in FIG. 3. These steps are preferably controlled by software running on the computer system.

At step 301, playback on a computer begins with identification of the secure area associated with the particular content to be played back. Identification of the specific secure area may not actually be accomplished by the computer, but instead the computer may identify the device containing the secure area or a link through which communication to the device containing the secure area may be established. In identifying the secure area associated with the particular content to be played back, the computer may reference a file system or a database, for example, which directs the computer, such as according to the type of content to be played back, the type of device to play back the content, the owner or author of the content, or the like.

At step 302, the computer obtains a list or other form of information regarding acceptable use devices and certificate authorities. This information may be obtained from the identified secure area or, as discussed above, may be published to the world with some form of authentication in place, such as a secure hash, to determine if it has been altered.

At step 303 the computer obtains the use device's public key and a list or other form of information regarding the certificates for that public key. At step 304 the information obtained at steps 302 and 303 are compared. If there is determined not to be a match at step 305, i.e., the use device is not acceptable to the content provider, processing proceeds to step 306 wherein a failure condition halts playback of protected information. However, if there is determined to be a match, i.e., identification of an authorized use device, processing proceeds to step 307.

At step 307 the computer provides to the storage device the public key for the acceptable use device and/or a certificate from an acceptable certificate authority. The storage device will preferably verify the public key and/or certificate and encrypt future communication with that public key or the public key associated with the certificate.

In operation according to the preferred embodiment, the computer will obtain a random number from the use device at step 308. At step 309 this random number is provided to the storage device. Preferably, the storage device will read the content key and/or content use information from a secure area in preparation for transmitting this information to the use device. In the most preferred embodiment, the random number provided by the use device is exclusive or-ed (XORed) with the content key, thus preventing other similar use devices from using the content key. Thereafter the XORed content key and the content use information are encrypted with the above identified public key for secure transmission through unsecure communication channels (including the host computer).

It should be appreciated that the use of the random number from the use device may be relied upon to add an extra layer of security to the transfer of the content key, if desired. For example, the random number may be encrypted by the use device, such as by using a public key of the storage device, thus preventing even a similar use device with access to a secret key corresponding to the same public key used in encrypting the content key cannot usefully decrypt the content key.

At step 310, the computer receives the encrypted content key and content use information from the storage device. Thereafter, at step 311, the encrypted content key and content use information are provided to the use device. Preferably the use device decrypts the information with its internal secret key. The content key may then be XORed with the random number known to the use device. Thereafter, authorized use may be made of the content as set forth in the content use information.

It should be appreciated that the above steps may be utilized in providing pay per view or similar uses. There is no requirement that the content key reside on the same medium as the content. Accordingly, for pay per view use, the above conversation only need be modified to be between the authorizing company and the playback device.

Figure 4:
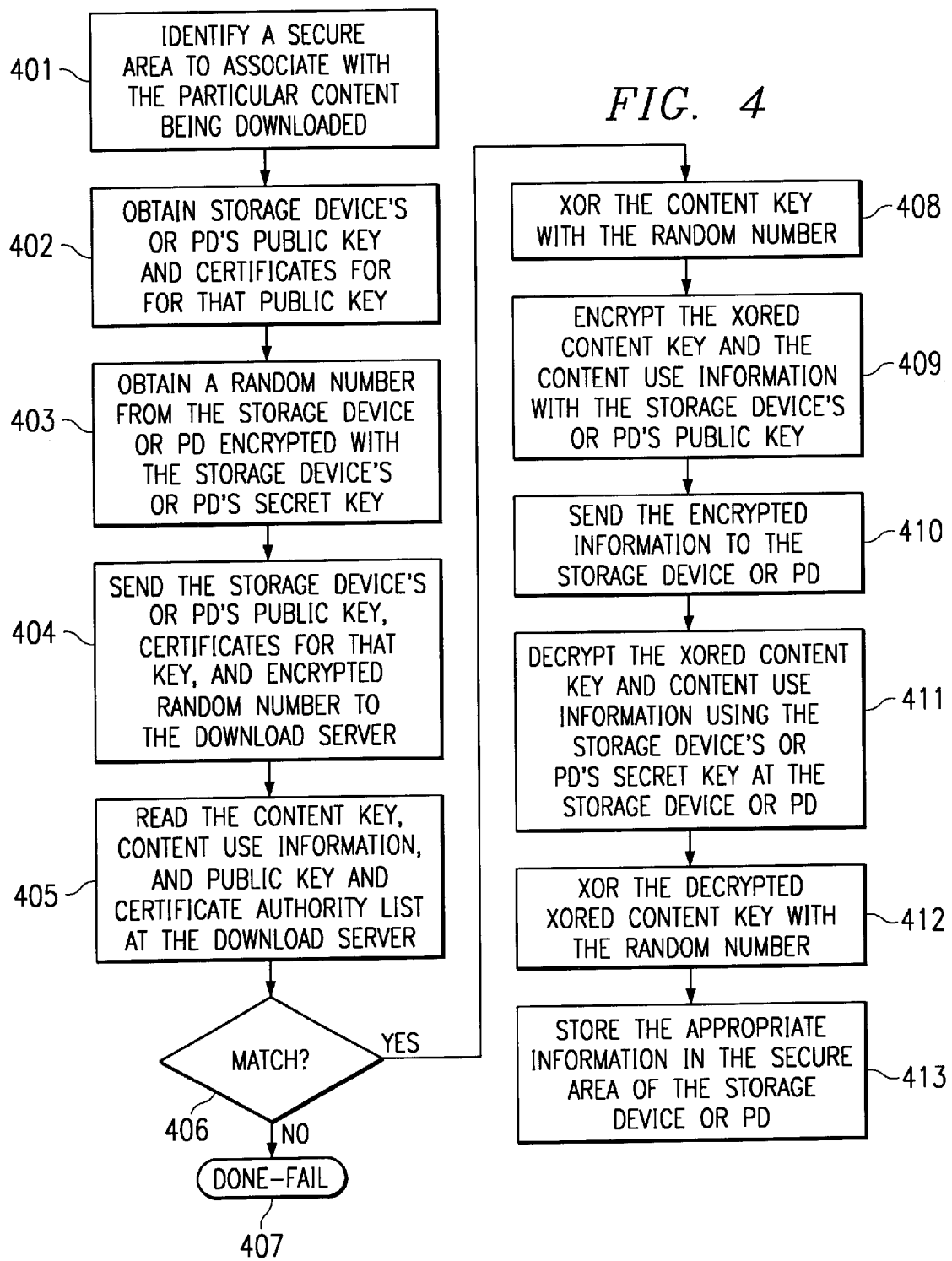
FIG. 4 illustrates a flow diagram of the download of protected content to a compliant storage device.

A preferred embodiment of the steps download to a storage device or a portable device (PD), such as the RIO available from Diamond Multimedia, for saving and later playback are shown in FIG. 4. Initially at step 401, a secure area is identified within the storage device or PD to associate with the content to be downloaded. The storage device's or PD's public key and/or certificates for the public key are obtained (step 402). A random number is also preferably obtained from the storage device or PD (step 403). This random number is preferably encrypted with the storage device's or PD's secret key.

At step 404, the storage device's or PD's public key and/or certificates for the public key and encrypted number are provided to a download server (which may itself be a storage device). The download server reads the content key, content use information, and public key and certificate authority list associated with the particular content to be downloaded (step 405). If there is no match between the storage device's or PD's public key or certificate and that read by the download server, then processing proceeds to step 407 wherein a failure condition halts download of protected information. However, if there is determined to be a match, i.e., identification of an authorized storage or PD device, processing proceeds to step 408.

At step 408, the content key is XORed with the random number, which as described above provides an added level of security. At step 409 the XORed content key and the content use information are encrypted with the storage device's or PD's public key. At step 410 the encrypted information is transmitted to the storage device or PD.

The storage device or PD decrypts the XORed content key and the content use information using the storage device's or PD's secret key. The decrypted XORed content key is XORed with the random number (step 412) and the appropriate decrypted information is stored in the identified secure area of the storage device or PD (step 413).

It should be appreciated that, in ones of the above described examples of operation according to the present invention, transfer of the actual content data is not specifically described. In operation of the present invention, it is presumed that the data of the actual content will always pass through some insecure channel and, thus, will be available no matter what attempts are made to block "inappropriate" transfers. Accordingly, the content data, which is encrypted using the content key, may be transferred by any means deemed advantageous. For example, transfer may be coincident with the transfer of the content key and content use information. Alternatively, transfer of the content data may occur prior to or after the transfer of this related data. In a preferred embodiment, the content data is transferred on bulk media, such as DVD-ROM prior to the transfer of the content key, in order to minimize the amount of data that is communicated electronically, such as over the Internet, via relatively slow data links.

It should be appreciated from the above discussion, that the present invention provides embodiments where the content may be backed up or otherwise copied without fear of the content being utilized in contravention of the rules established by the content provider. For example, the above described embodiments wherein encrypted content, content key, and content use information is stored in unsecure areas, this information may easily be archived in case of failure of the storage device or use device of the present invention.

However, in particular embodiments described above, such as where the content key is encrypted using a cryptographic key unique to the security device, the security device provides a single point of failure in the system. Accordingly, a preferred embodiment of the present invention provides the ability to clone the security device, such as the aforementioned IBUTTON.

It should be realized that particular works protected according to the present invention may be authorized for use throughout the life time of the owner of the use device. Accordingly it may not be practical to establish a limit on the number of times the security device may be cloned. Accordingly, a preferred embodiment of the present invention ties the security device to the owner's identity. For example, owner information such as social security number, credit card number, driver license number, or the like may be encoded within the security device. In this embodiment, the owner may incur some form of natural penalty, i.e., owner secret information may be compromised and/or the owner may be easily identified, from the distribution of clone security devices, thus giving him an incentive to police this function. Additionally or alternatively, the rules established in the security device allowing for its cloning may be such that whenever a cloning operation is performed, the contents of the older generation security device are completely erased or otherwise rendered useless.

According to a preferred embodiment of the present invention, each piece of media may contain a list of use devices the content provider or authors deem acceptable. An acceptable use device as recognized by the content provider is likely to be one that does not deliver either the content key or decrypted data to the user. Accordingly, a compliant storage and/or use device may easily determine if the content and content key may be acquired by a particular device. However, it is envisioned that devices acceptable to the content provider or author will continue to be developed after content has been protected according to the present invention and, therefore, after a list of use devices has been placed on a particular media (or otherwise associated with protected content).

Protection of content according to preferred embodiments of the present invention allows for certificates to be generated at any time, thus allowing authorization storage and/or use devices after a particular work has been protected. For example if the content provider lists himself as a certification authority, individual use devices can be enabled at any time by making a certificate available.

The public key system of the present invention limits knowledge of the secret keys to very few people. For example, a secure device maker could embed the secret key in the secure device at time of manufacture, thus preventing all others from knowing the secret. The corresponding public key could be broadcast to whoever desired to listen. Such a technique is very secure as discovery of the secret key becomes more likely when shared by many people.

It shall be appreciated that according to the preferred embodiment of the present invention, as shown above, no unique host or drive identifier is available or required. This is allow for changing hardware due to upgrades or failure.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for preventing unauthorized utilization of content, said method comprising the steps of:
  establishing a plurality of compliant devices ones of which are storage devices and other ones of which are use devices, wherein ones of said plurality of compliant devices meet different levels of compliant operation and all of said plurality of compliant devices meet a minimum operational level of protecting a cryptographic key associated with protected content, and wherein each compliant device of said plurality of compliant devices includes at least one element of the set consisting of a public cryptographic key and an electronic certificate;
  selecting a first cryptographic key to be associated with said content;
  encrypting said content using said first cryptographic key;
  selecting content use information from a set of pre-established content use information to proscribe use of said content;
  protecting said selected content use information from unauthorized alteration;
  identifying ones of said plurality of compliant devices for which utilization of said content is to be authorized to thereby establish an authorized compliant device set, wherein said authorized compliant device set includes only compliant devices of said plurality of compliant devices meeting a desired threshold standard of operation;
  establishing acceptable compliant device information, wherein said acceptable compliant device information includes at least one element of the set consisting of said public cryptographic key and said electronic certificate for each compliant device of said authorized compliant device set;
  associating said first cryptographic key, said protected content use information and said acceptable compliant device information with said encrypted content; and
  storing said first cryptographic key in a secure storage area of a storage device of said authorized compliant device set.

2. The method of claim 1, wherein the step of protecting said selected content use information comprises the step of:
  encrypting said selected content use information using said first cryptographic key.

3. The method of claim 1, wherein the step of protecting said selected content use information comprises the step of:
  creating a protected hash of said selected content use information.

4. The method of claim 1, wherein said minimum operational level of protecting a cryptographic key associated with protected content requires said compliant device to never communicate a cryptographic key associated with protected content in unencrypted form external to said compliant device.

5. The method of claim 1, wherein said step of establishing compliant device information comprises the step of:

listing public cryptographic keys of devices meeting a particular standard of operation.

6. The method of claim 1, wherein said step of establishing compliant device information comprises the step of:

listing the electronic certificates of certificate authorities trusted to determine devices meet said particular standard of operation.

7. The method of claim 1, wherein said step of establishing compliant device information comprises the steps of:

listing public cryptographic keys of devices meeting a particular standard of operation; and listing the electronic certificates of certificate authorities trusted to determine devices meet said particular standard of operation.

8. The method of claim 1, wherein said step of identifying ones of said plurality of compliant devices to establish an authorized compliant device set comprises the step of:

identifying compliant devices including a particular implementation, wherein said particular implementation is selected from the group consisting of a hardware implementation, a software implementation, a high security implementation, a low security implementation, an audio device implementation, a video device implementation, and a banking device implementation.

9. The method of claim 1, wherein said step of identifying ones of said plurality of compliant devices to establish an authorized compliant device set comprises the step of:

identifying an electronic certificate associated with a particular trusted certification authority.

10. The method of claim 1, further comprising the step of:

cloning at least a secure portion of a compliant device of said plurality of compliant devices, wherein a cloned at least a secure portion of said compliant device provides operational abilities with respect to protected content coextensive with that of said at least a secure portion of said compliant device cloned.

11. The method of claim 10, wherein said cloning step renders said at least a secure portion of said compliant device cloned inoperable for further use with said protected content.

12. The method of claim 10, wherein said cloning step produces a backup copy of said at least a secure portion of said complaint device cloned.

13. A system for protecting content, said system comprising:

a set of content use rules wherein portions of said content use rules are selectable to be associated with protected content in order to define authorized uses thereof;

a protected form of said content, wherein said protected form of said content includes an encryption of said content, a content key associated with said encryption of said content, an identification of devices authorized for use with said content, and a subset of said content use information defining authorized use of said content;

a plurality of devices providing compliant operation according to said system, wherein said compliant operation according to said system at least proscribes the use and communication of said content key associated with said protected content, and wherein said plurality of compliant devices comprise:

a use device having a secure storage area associated therewith, wherein said use device includes a public/secret cryptographic key set, wherein a secret key of said public/secret cryptographic key set is stored in said secure storage area; and a storage device storing said identification of devices authorized for use with said content, wherein said storage device operates under control of an instruction set and has a secure storage area associated therewith, wherein said content key is stored in said secure storage area and is passable to said use device under control of said instruction set only if said use device is identifiable with said identification of devices authorized for use with said content.

14. The system of claim 13, wherein said encryption of said content is stored separate from said storage device.

15. The system of claim 13, wherein said use device further comprises:

a decryption engine for asymmetric decryption of messages protected using said public/secret cryptographic key set; and a decryption engine for symmetric decryption of said content using said content key.

16. The system of claim 13, wherein said storage device further comprises:

encryption engine for asymmetric encryption of said content key using said public/secret cryptographic key set.

17. The system of claim 13, wherein said secure storage area associated with said use device is disposed in a security device including a memory, a processor, and an instruction set incarcerated in a tamper resistant housing removably coupled to a remainder of said use device.

18. The system of claim 13, wherein said secure storage area associated with said storage device is disposed in a security device including a memory, a processor, and an instruction set incarcerated in a tamper resistant housing removably coupled to a remainder of said storage device.

19. A method for protecting electronic content, said method comprising the steps of:

providing a compliant first device having a secure storage area associated therewith;

providing a compliant second device having a secure storage area associated therewith;

providing a content cryptographic key;

encrypting said content using said content cryptographic key;

storing said content cryptographic key in said secure storage area of said compliant first device;

identifying particular rules of a plurality of rules to establish authorized uses of said content;

preventing unauthorized alteration of said identified rules;

identifying devices of a plurality of devices authorized for use with said content to thereby provide identified device information;

preventing unauthorized alteration of said identified device information;

providing a device public/secret cryptographic key set;

storing a device secret key of said device public/secret cryptographic key set in said secure storage area of said compliant second device;

establishing communication between said compliant first device and said compliant second device to thereby provide a communication link;

comparing, at said compliant first device, information with respect to said compliant second device to said identified device information;

determining if said compliant second device is authorized for use with said content at least in part from information derived from said comparing step; and if said compliant second device is determined to be authorized for use with said content at said determining step, performing the steps of:

encrypting, at said compliant first device, said content cryptographic key using a public key of said device public/secret cryptographic key set;

communicating said encrypted content cryptographic key from said compliant first device to said compliant second device;

decrypting, at said compliant second device, said encrypted content cryptographic key using said secret key stored in said compliant second device's secure storage area; and storing said content cryptographic key in said compliant second device's secure storage area, wherein said stored content cryptographic key is identified with said content by said compliant second device.

20. The method of claim 19, wherein said step of comparing utilizes said public key provided to said compliant first device from said compliant second device via said communication link.

21. The method of claim 19, wherein said step of comparing utilizes an electronic certificate provided to said compliant first device from said compliant second device via said communication link.

22. The method of claim 19, wherein said step of identifying said devices of said plurality of devices authorized for use with said content includes a step selected from the group consisting of:

identifying an implementation of devices considered to provide an acceptable level of operational compliance;

identifying a certificate authority considered to provide an acceptable level of determination of operational compliance of devices;

identifying an electronic certificate associated with a group of devices considered to provide an acceptable level of operational compliance; and identifying a public key associated with a group of devices considered to provide an acceptable level of operational compliance.

23. The method of claim 19, wherein at least one of said steps of preventing unauthorized alteration of said identified rules and preventing unauthorized alteration of said identified device information comprises the step of:

providing said one of said identified rules and said identified device information in clear text and associating a protection code therewith, wherein said protection code is relied upon to detect alteration of said clear text information.

24. A method for protecting electronic content comprising:

providing a compliant device having a secure storage area with at least a device secret key of a device public/secret cryptographic key set stored therein;

encrypting said content using a content cryptographic key;

identifying devices of a plurality of devices authorized for use with said content to thereby provide identified device information;

determining if said compliant device is authorized for use with said content at least in part through reference to said identified device information; and if said compliant device is determined to be authorized for use with said content at said determining step, performing the steps of:.

decrypting said encrypted content cryptographic key using said secret key stored in said compliant device's secure storage area; and storing said content cryptographic key in said compliant device's secure storage area, wherein said stored content cryptographic key is identified with said content by said compliant device.

25. The method of claim 24, further comprising:

establishing rules for authorized uses of said content, wherein use of said content cryptographic key stored in said compliant device's secure storage area to decrypt said encrypted content is in accordance with said rules for authorized uses of said content.

26. The method of claim 24, further comprising:

comparing, at a second compliant device, information with respect to said compliant device to said identified device information.

27. The method of claim 26, wherein said step of comparing utilizes a public key corresponding to said secret key stored in said compliant device's secure storage area provided to said second compliant device from said compliant device via a communication link therebetween.

28. The method of claim 26, wherein said step of comparing utilizes an electronic certificate provided to said second compliant device from said compliant device via a communication link therebetween.

29. A system for protecting content comprising:

a plurality of devices providing compliant operation which at least proscribes the use and communication of a content key associated with a protected content, and wherein said plurality of compliant devices comprise:

a use device having a secure storage area associated therewith, wherein said use device includes a public/secret cryptographic key set, wherein a secret key of said public/secret cryptographic key set is stored in said secure storage area; and a storage device storing identification of compliant devices authorized for use with said content, wherein said storage device has a secure storage area associated therewith storing said content key which is passable to said use device only if said use device is identifiable with said identification of devices authorized for use with said content.

30. The system of claim 29, further comprising:

a set of content use rules wherein portions of said content use rules are selectable to be associated with protected content in order to define authorized uses thereof, wherein use of protected content by said use device is in accordance with portions of said content use rules associated therewith.

31. The system of claim 29, wherein said protected content comprises:

an encryption of said content, a content key associated with said encryption of said content, an identification of devices authorized for use with said content, and a subset of said content use information defining authorized use of said content.

32. The system of claim 29, wherein said secure storage area associated with said use device is disposed in a security device including a memory, a processor, and an instruction set incarcerated in a tamper resistant housing removably coupled to a remainder of said use device.

* * * * *